United States Patent
Farnbach (10) Patent No.: US 6,684,236 B1
(45) Date of Patent: Jan. 27, 2004

(54) SYSTEM OF AND METHOD FOR EFFICIENTLY PERFORMING COMPUTATIONS THROUGH EXTENDED BOOTH ENCODING OF THE OPERANDS THERETO

(75) Inventor: William A. Farnbach, San Diego, CA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

(21) Appl. No.: 09/504,392

(22) Filed: Feb. 15, 2000

(51) Int. Cl.$^7$ .................................................. G06F 7/52
(52) U.S. Cl. ...................... 708/628; 708/625; 708/620
(58) Field of Search .............................. 708/515, 630, 708/627, 626, 628, 625, 701

(56) References Cited

U.S. PATENT DOCUMENTS

| | | | | |
|---|---|---|---|---|
| 3,878,985 A | * | 4/1975 | Ghest et al. ................ | 708/627 |
| 4,122,527 A | * | 10/1978 | Swiatowiec .................. | 708/701 |
| 4,229,800 A | * | 10/1980 | Gregorian et al. .......... | 600/515 |
| 4,748,582 A | * | 5/1988 | New et al. ................... | 708/625 |
| 4,748,584 A | * | 5/1988 | Noda .......................... | 708/630 |
| 4,817,029 A | * | 3/1989 | Finegold .................... | 708/630 |
| 4,868,777 A | * | 9/1989 | Nishiyama et al. ......... | 708/493 |
| 4,879,677 A | * | 11/1989 | Shiraishi .................... | 708/630 |
| 5,289,398 A | * | 2/1994 | Miyoshi et al. ............. | 708/493 |
| 5,379,244 A | * | 1/1995 | Miyoshi et al. ............. | 708/493 |
| 5,473,559 A | * | 12/1995 | Makino ....................... | 708/626 |
| 5,636,155 A | * | 6/1997 | Kabuo ........................ | 708/631 |
| 5,751,619 A | * | 5/1998 | Agarwal et al. ............ | 708/523 |
| 5,835,393 A | * | 11/1998 | Melanson et al. .......... | 708/628 |
| 5,941,942 A | * | 8/1999 | Kleine ........................ | 708/632 |
| 5,944,776 A | * | 8/1999 | Zhang et al. ................ | 708/625 |
| 6,167,422 A | * | 12/2000 | Purcell et al. .............. | 708/628 |
| 6,173,304 B1 | * | 1/2001 | Goldovsky et al. ......... | 708/630 |

OTHER PUBLICATIONS

Booth, Andrew D., *A Signed Binary Multiplication Technique*; (Received Aug. 1, 1950), Quart. Journ. Mech. and Applied Math, vol. IV Pt.2, pp. 236–240, 1951.

Chen, C.H., ed., *Computer Engineering Handbook*, McGraw–Hill, Inc., pp. 4.10–4.12, 14.9–14.12, Jul. 1992.

Weste, N.E.H. and Eshraghian, K., *Principles of CMOS VLSI Design: A System Perspective*, Addison–Wesley Publishing Co., pp. 547–554, 2$^{nd}$ Ed. 1993.

Mlynek, D. and Leblebici, Y., *Design of VLSI Systems*, Chapter 6, "Arithmetic for Digital Systems", Nov. 10, 1998, (41 pages), available at http://vlsi.wpi.edu/webcourse/ch06/ch06.html.

\* cited by examiner

*Primary Examiner*—Chuong Dinh Ngo
*Assistant Examiner*—Chat C. Do
(74) *Attorney, Agent, or Firm*—Howrey Simon Arnold & White, LLP (57) ABSTRACT

A system of and method for extended Booth encoding of two binary numbers, K and L. A stage of the encoder receives K[2n+1], K[2n], L[2n+1], and C[n−1], N−1≧n≧0, with N being the length of L, and it being assumed L[2n]=0, and forms C[n], S[n], M1[n], and M2[n] according to the following equations: C[n]=K[2n+1]|L[2n+1], S[n]=K[2n+1]^L[2n+1], M1[n]=K[2n]^C[n−1], M2[n]=(S[n]&/K[2n]&/C[n−1])|(/S[n]&K[2n]&C[n−1]), where | refers to the logical OR function, ^ to the exclusive OR function, & to the logical AND function, and / to the logical inversion function. Numerous applications are discussed such as using the extended Booth encoded numbers to perform arithmetic computations of the form Z=(±X±Y)*±W.

20 Claims, 6 Drawing Sheets

FIGURE 1: a truth table for the extended Booth encoder

| INPUTS | | | | | OUTPUTS | | | | |
|---|---|---|---|---|---|---|---|---|---|
| L'[2n+1] value = 2 | K'[2n+1] value = 2 | K'[2n] value = 1 | C[n-1] value = 1 | Sum of Inputs | C[n] value = 4 | S[n] 0 = + 1 = - | M2[n] Value = 2 | M1[n] Value = 1 | Sum of Outputs |
| 0 | 0 | 0 | 0 | 0 | 0 | 0* | 0 | 0 | 0+0 = 0 |
| 0 | 0 | 0 | 1 | 1 | 0 | 0 | 0 | 1 | 0+1 = 1 |
| 0 | 0 | 1 | 0 | 1 | 0 | 0 | 0 | 1 | 0+1 = 1 |
| 0 | 0 | 1 | 1 | 2 | 0 | 0 | 1 | 0 | 0+2 = 2 |
| 0 | 1 | 0 | 0 | 2 | 1 | 1 | 0 | 0 | 4-2 = 2 |
| 0 | 1 | 0 | 1 | 3 | 1 | 1 | 0 | 1 | 4-1 = 3 |
| 0 | 1 | 1 | 0 | 3 | 1 | 1 | 0 | 1 | 4-1 = 3 |
| 0 | 1 | 1 | 1 | 4 | 1 | 1* | 0 | 0 | 4-0 = 4 |
| 1 | 0 | 0 | 0 | 2 | 1 | 1 | 1 | 0 | 4-2 = 2 |
| 1 | 0 | 0 | 1 | 3 | 1 | 1 | 0 | 1 | 4-1 = 3 |
| 1 | 0 | 1 | 0 | 3 | 1 | 1 | 0 | 1 | 4-1 = 3 |
| 1 | 0 | 1 | 1 | 4 | 1 | 1* | 0 | 0 | 4-0 = 4 |
| 1 | 1 | 0 | 0 | 4 | 1 | 0* | 0 | 0 | 4+0 = 4 |
| 1 | 1 | 0 | 1 | 5 | 1 | 0 | 0 | 1 | 4+1 = 5 |
| 1 | 1 | 1 | 0 | 5 | 1 | 0 | 0 | 1 | 4+1 = 5 |
| 1 | 1 | 1 | 1 | 6 | 1 | 0 | 1 | 0 | 4+2 = 6 |

* Since the quantity added or subtracted is zero, the sign, S[n] doesn't matter. The encoding here yields the simplest encoding logic; however other values of S[n] may be chosen to satisfy other engineering objectives.

FIGURE 2:
One possible implementation of an extended Booth encoder.

FIGURE 3:
One possible implementation of a reformatter.

a1) Bit zero, n = 0, with no carry in.

a2) Bit zero, n = 0, with a carry in, Cin.

b) Other bits, n > 0.

SYSTEM OF AND METHOD FOR EFFICIENTLY PERFORMING COMPUTATIONS THROUGH EXTENDED BOOTH ENCODING OF THE OPERANDS THERETO

BACKGROUND OF THE INVENTION

1. Field of the Invention

This invention relates generally to Booth encoding, and more specifically, to efficiently performing computations through extended Booth encoding of the operands thereto.

2. Background

Many Digital Signal Processor ("DSP") applications involve or require multiplying the sum or difference of two or more signed (two's-complement) binary numbers, (X±Y), by a third signed binary number, W, resulting in Z=W*(X±Y). In a symmetric finite impulse response (FIR) filter, for example, the separate multiplication of two samples, $s_i$ and $s_j$, by the same coefficient, $c_k$, can be replaced by the computation $c_k*(s_i+s_j)$, resulting in the savings of a multiplier. Similarly, in a multiplication of two complex numbers, each of the real and imaginary components of the product can be determined through three computations of the form C*(A+B), resulting in the saving of a multiplier. Each of these examples requires an addition before the multiplication.

In current practice, two numbers must be added in a carry-propagate adder before the multiplication can be efficiently performed. Carry-save adders are commonly used to sum multiple input vectors (K0+K1+ . . . +Kn) to produce sum and carry vectors, S and C. In current practice, S and C must be added in a carry propagate adder before the product, Z=W*(K0+K1+ . . . +Kn) can be efficiently produced.

Unfortunately, the carry-propagate adder required by these computations imposes a tradeoff between size and speed. A ripple carry adder, for example, is small but slow. In contrast, a carry-look-ahead adder, while fast, is large. No conventional adder is available which combines the size advantage of the ripple carry adder with the speed advantage of the carry lookahead adder.

Consequently, there is a need for a system for and method of performing the computation Z=W*(X±Y) which is not subject to the foregoing tradeoff between size and speed.

There is further a need for a system for and a method of performing such computations which overcomes one or more disadvantages of the prior art.

The objects and advantages of the subject invention include fulfillment of any of the foregoing needs, singly or in combination.

Additional objects and advantages will be set forth in the description which follows or will be apparent to those of skill in the art.

SUMMARY OF THE INVENTION

To achieve one or more of the foregoing objects, and in accordance with the invention as broadly described herein, there is provided, in a first embodiment of the subject invention, a system of and method for performing extended Booth encoding of two signed binary numbers, K and L. In one implementation, the extended Booth encoder converts the sum K[2n+1:2n]+L[2n+1], where L[2n]=0, into the Booth triplet M2[n], M1[n], and S[n]. In one application, this triplet can then combined with a third signed binary number W to form the partial-product vectors PP[n] which are summed to produce Z=(K+L)*W in the same manner that the triplet produced by a standard Booth encoder is used combine partial products.

A second embodiment of the subject invention comprises a system for and a method of multiplying the sum or difference of two signed binary numbers, X and Y, by a third signed binary number W.

In this embodiment, an extended Booth encoder is included for encoding the sum of the operands X and Y to form encoded data. Partial products circuitry, identical to that used with standard modified Booth encoding, is also included for forming, responsive to the encoded data, a plurality of partial products, PP. The partial products, PP, are then added or subtracted, again responsive to the encoded data, together to form Z.

DETAILED DESCRIPTION OF THE PREFERRED EMBODIMENTS

I. Background: The Classical Booth Encoder

In computing the product Z=X*W, the classical Booth encoder converts the binary-weighted bit-pair X[2n+1:2n] into the Booth triplet M2[n], M1[n], and S[n]. This triplet is then combined with W to form the partial-product vector PP[n] according to the following rules: When M1[n]=1, PP[n] is set to 1*W*(4**n); when M2[n]=1, PP[n] is set to 2*W*(4**n); and when both M1[n] and M2[n] are zero, PP[n] is set to 0. (In any Booth encoded implementation, M1[n] and M2[n] cannot be 1 at the same time.) Each partial product PP[n], N−1<=n<=0, is then added to or subtracted from Z, responsive to S[n], using the following rules: when S[n]=0, PP[n] is added to Z, and when S[n]=1, PP[n] is subtracted from Z.

In one implementation example, the partial products are added or subtracted together using a carry-save adder, such as a Wallace tree, followed by a carry-propagate adder. In this implementation example, a carry-save adder sums all the partial products to produce sum and carry output vectors, S and C. The carry-propagate adder then adds S and C to produce the final output, Z.

II. The Extended Booth Encoder

Figure 4A:
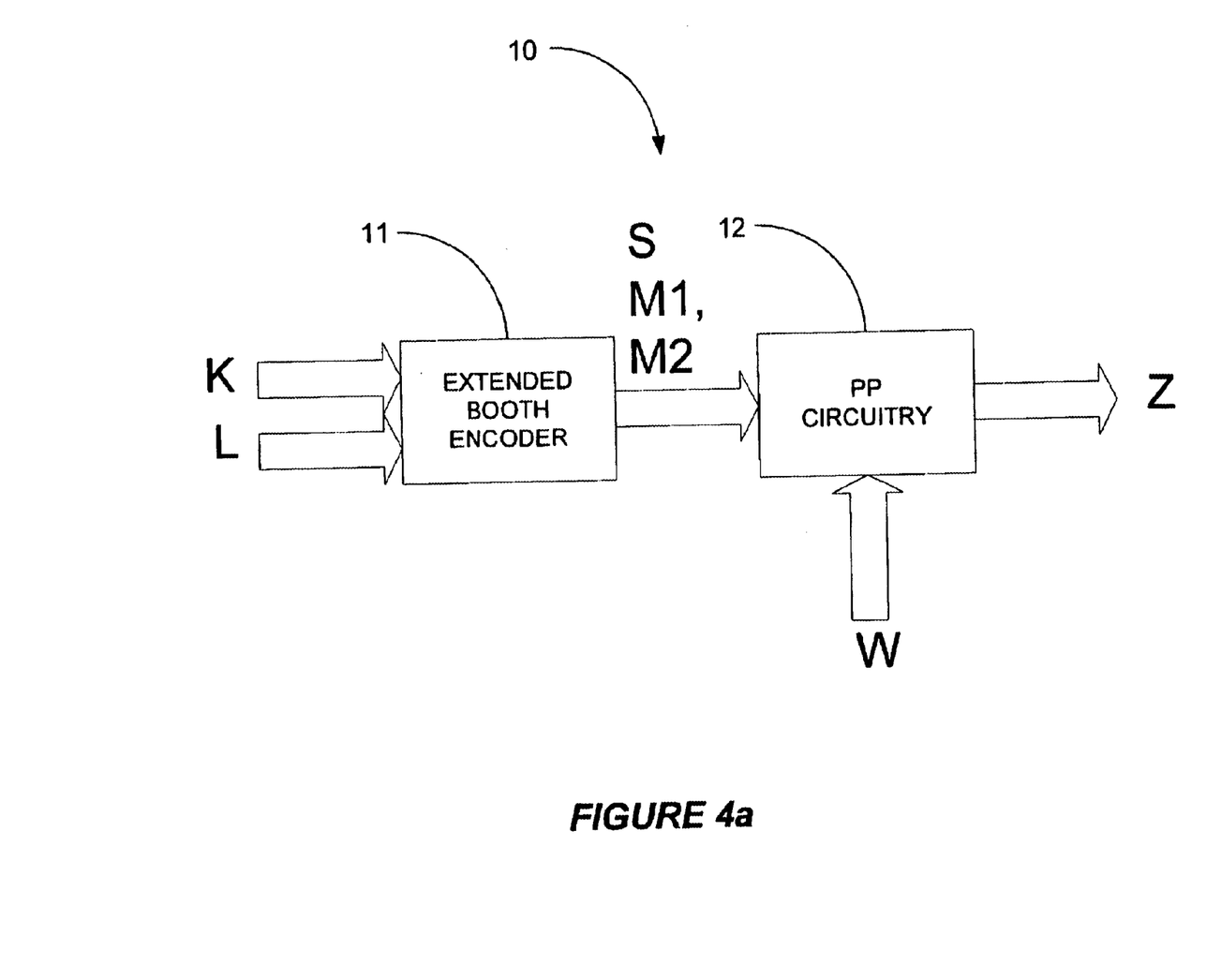
FIG. 4a is a block diagram of a system for performing an arithmetic computation of the form Z=(K+L)*W, where L[2n]=0.

A system 10 for computing Z=(K+L)*W is illustrated in FIG. 4a. As illustrated, the system comprises extended Booth encoder 11 and partial products circuitry 12.

In computing the product Z=(K+L)*W, the extended Booth encoder 11 converts the sum K[2n+1:2n]+L[2n+1], where L[2n]=0, into the Booth triplet M2[n], M1[n], and S[n]. In the partial products circuitry 12, these triplets can then combined with W to form the partial-product vectors PP[n], which are summed to produce Z=(K+L)*W in the same manner that the triplets produced by a standard Booth encoder produces Z=X*W.

Figure 1:
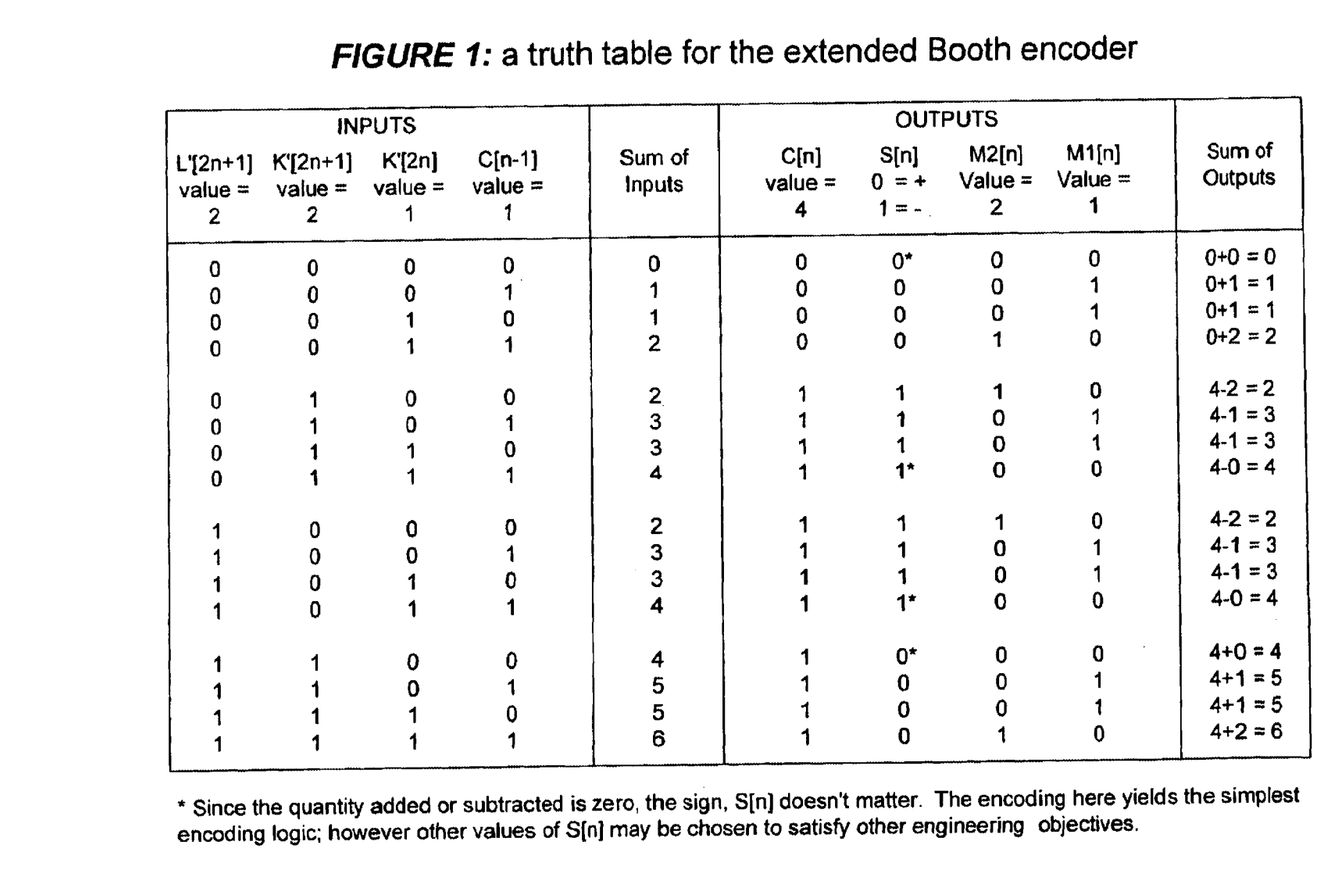
FIG. 1 is a truth table for the extended Booth encoder.

FIG. 1 gives the truth table for the extended Booth encoder. The outputs of this truth table satisfy the requirements of a classical Booth code as the sum of the binary-weighted inputs equals the Booth-coded sum of the outputs and M1 and M2 are never 1 at the same time (that is, for the same set of inputs). C[n] is used to encode the next triplet, K[2n+3:2n+2]+L[2n+2], but is not used directly in forming the partial products for the multiplier. It can be seen from FIG. 1 that C[−1], i.e., C[n−1] when n=0, functions as a "carry" into the encoder: if C[−1]=1, then (K+L+1) is Booth encoded. If no carry input is needed, C[−1] is set to 0.

The truth table of FIG. 1 can be represented by, among others, the following equations:

$$C[n]=K[2n+1]|L[2n+1]$$ (Equation 1a)

$$S[n]=K[2n+1] \hat{}\, L[2n+1]$$ (Equation 1b)

$$M1[n]=K[2n] \hat{}\, C[n-1]$$ (Equation 1c)

$$M2[n]=(S[n]\&/K[2n]\&/C[n-1])|(/S[n]\&K[2n]\&C[n-1])$$ (Equation 1d)

where | refers to the logical OR function, ^ to the exclusive OR function, & to the logical AND function, and / to the inversion function.

Figure 2:
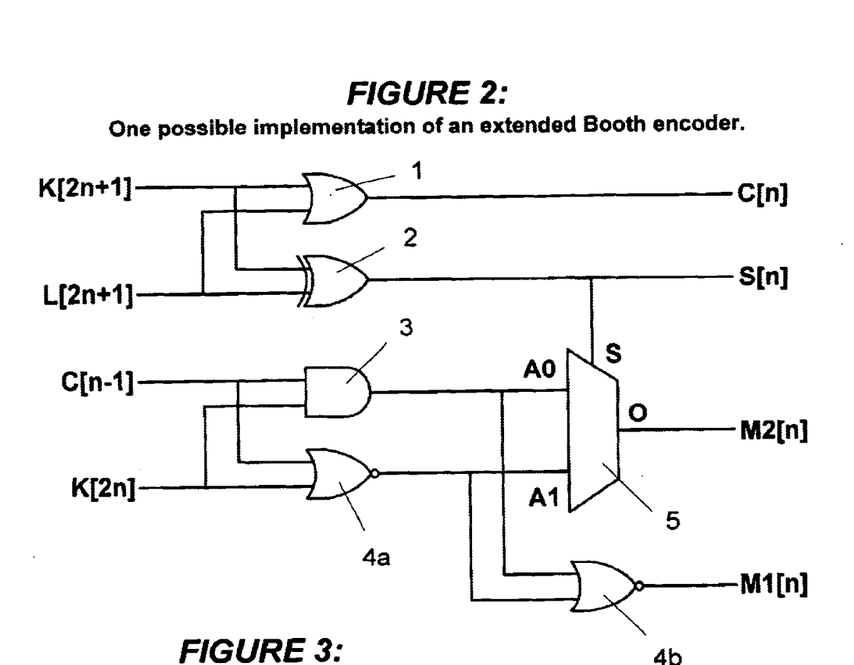
FIG. 2 illustrates one implementation of the extended Booth encoder.

FIG. 2 shows one implementation of the extended Booth encoder in logic elements suitable for use in hardware circuits. In this figure, element 1 is a logical OR gate, element 2 is an exclusive OR gate, element 3 is a logical AND gate, elements 4a and 4b are logical NOR gates, and element 5 is a multiplexor which outputs A0 when S=0, and outputs A1 when S=1. It should be appreciated, however, that other implementations are possible in which the function of the Booth encoder is implemented in software executable by a processor. The software may be stored on a computer readable medium accessible by a processor.

The value of S[n] when M1[n]=0 and M2[n]=0 does not matter from an arithmetic standpoint as +0=−0. The equation for S[n] shown above yields the simplest logic implementation; however, other equations for S[n] may be employed to achieve different objectives. For example, power might be saved in some multiplier implementations if S[n] for M1[n]=0 and M2[n]=0 always has the same value, either 1 or 0.

Note that, if L[2n+1] is set to 0, Equations 1a–1d become:

$$C[n]=K[2n+1]$$ (Equation 2a)

$$S[n]=K[2n+1]$$ (Equation 2b)

$$M1[n]=K[2n] \hat{}\, C[n-1]$$ (Equation 2c)

$$M2[n]=(S[n]\&/K[2n]\&/C[n-1])|(/S[n]\&K[2n]\&C[n-1])$$ (Equation 2d)

These are the equations for a standard Booth encoder. This means that, if L[2n+1]=0, the pair K[2n+1:2n] can be encoded using a standard Booth encoder or an extended Booth encoder with L[2n+1] set to 0.

There are three restrictions on K implicit in this discussion: 1) K is a signed, two's-complement number; 2) the length of K is even so that the bits of K can be extended Booth encoded in pairs; and, 3) K is at least as long as L. The first restriction can be removed by appending a 0 to the most-significant end of K to make K an unsigned number. The second and third restrictions can be removed by sign extending K until its length is even and it is longer than L.

One skilled in logic design will realize that these limitations can also be overcome by generating special truth tables and logic equations similar to FIG. 1 and Equations 1a–1d for the top bits of K and L. This effort usually does not generate any significant savings in logic or complication compared to the extensions to K proposed above.

III. Example Applications for Extended Booth Encoder

Figure 4B:
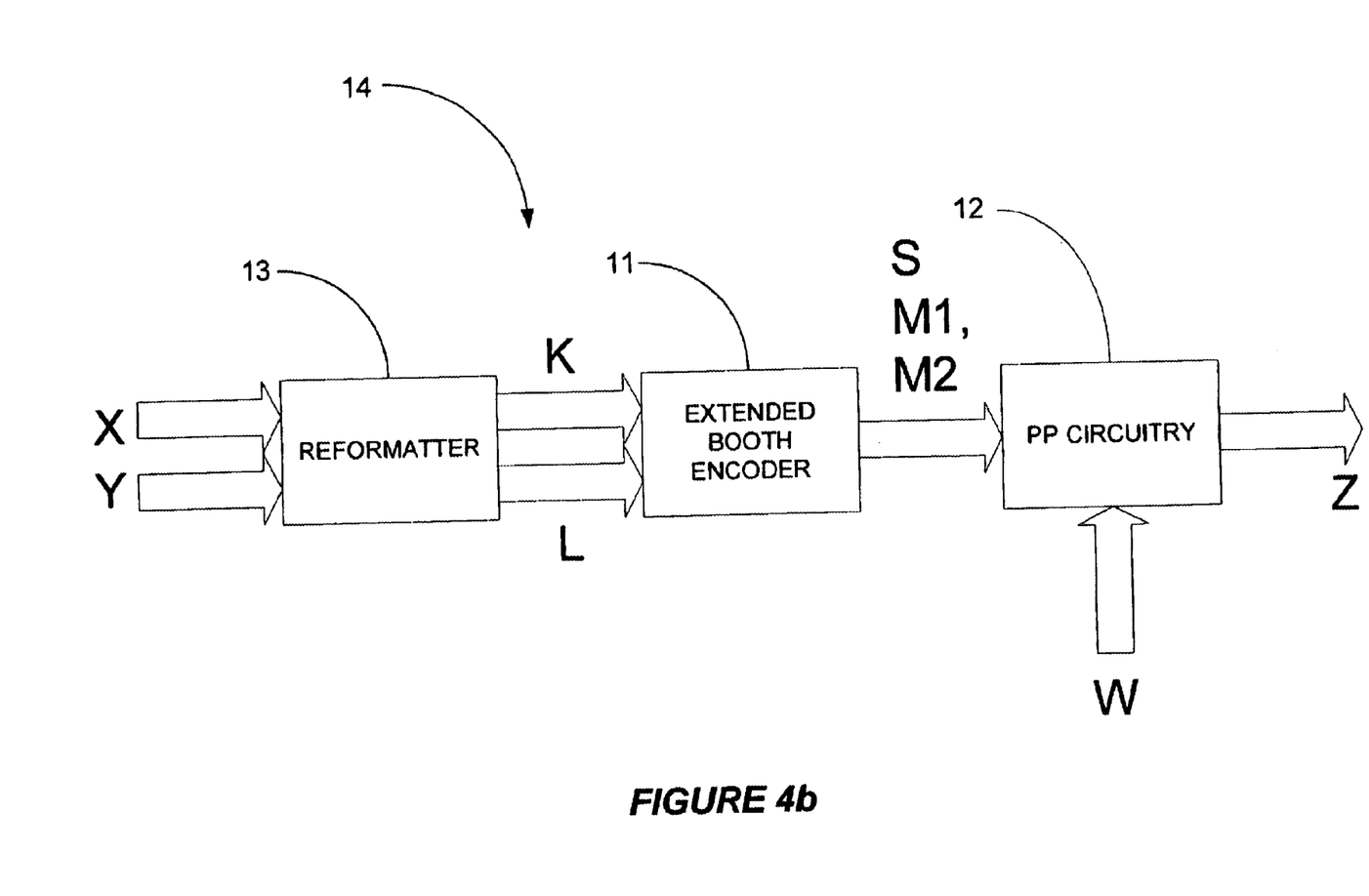
FIG. 4b is a block diagram of a system for performing an arithmetic computation of the form Z=(X+Y)*W.

A system 14 for performing the general computation Z=(X+Y)*W is illustrated in FIG. 4b. As illustrated, the system comprises reformatter 13, extended Booth encoder 11, and partial products circuitry 12.

In order to perform the operation Z=W*(X+Y), inputs X and Y must be converted into K and L so that X[N−1:0]+Y[N−1:0]=K[N:0]+L[N−1:0], and L[2n]=0. One way to do this is to use reformatter 13 which, in one implementation, functions as follows: First, if N is even, sign-extend X and Y by one bit so that N is odd: this will make the length of K even after it is extended one bit during the addition shown below.

Second, add X to Y in the adder comprising multiple half adders and full-adders arranged into two-bit-long ripple-carry adders as follows: For n=0, use the one-bit-long half-adder:

U0: Half-Adder
   (A←X[0],
   B←Y[0],
   SUM→K[0],
   $C_{out}$→K[1]
   );

or, if a carry input is desirable, use a full-adder:

U0: Full-Adder
   (A←X[0],
   B←Y[0],
   C←Cin,
   SUM→K[0],
   $C_{out}$→K[1]
   );

For (N−1)/2>=n>=1, use the two-bit-long ripple-carry adder:

U1: Half-Adder
   (A←X[2n−1],
   B←Y[2n−1],
   SUM→L[2n−1],
   $C_{out}$→Tmp[2n]
   );

U2: Full-Adder
   (A←X[2n],
   B←Y[2n],
   CIN←Tmp[2n],
   SUM→K[2n],
   $C_{out}$→K[2n+1]
   );

The logic equations for the half-adder are well known to anyone skilled in logic design. They are:
   SUM[i]=X[i]^Y[i], and
   CARRY[i]=X[i]& Y[i].

The logic equations for the full-adder are also well known to anyone skilled in logic design. They are:
   SUM[i]=X[i]^Y[i]^Cin[i], and
   CARRY[i]=(X[i]&Y[i])|(X[i]&Cin[i])|(Y[i]&Cin[i]).

Figure 3:
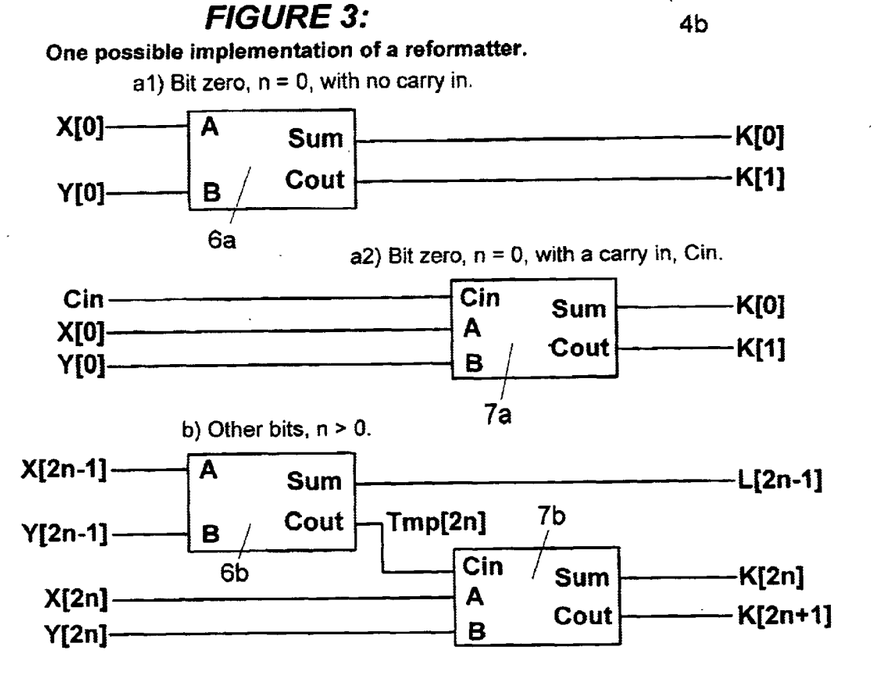
FIG. 3 illustrates one implementation of a reformatter.

Examples of hardware implementations for the reformatter are shown in FIG. 3. FIG. 3a1 illustrates the case in which n=0, and there is no carry in. FIG. 3a2 illustrates the case in which n=0, and there is a carry in. FIG. 3a3 illustrates the case in which n>0. In each of these cases, the elements 6a, 6b are half adders with no carry in bit, while elements 7a, 7b are full adders with a carry in bit.

When this has been accomplished, in extended Booth encoder 11, K+L is encoded using the extended Booth encoder and the resultant Booth triplets, S, M2, and M1, are processed in partial products circuitry 12 as has been described previously.

The advantage of adding X to Y using the extended Booth encoder instead of using a carry-propagate adder increases as the length of the input vectors increase because the carry propagation delay for a carry-propagate adder increases as the length of the input vectors, but a carry need only be propagated one bit, from L[2n] to L[2n+1], for the extended Booth encoder, no matter how long the input vectors are.

Figure 4C:
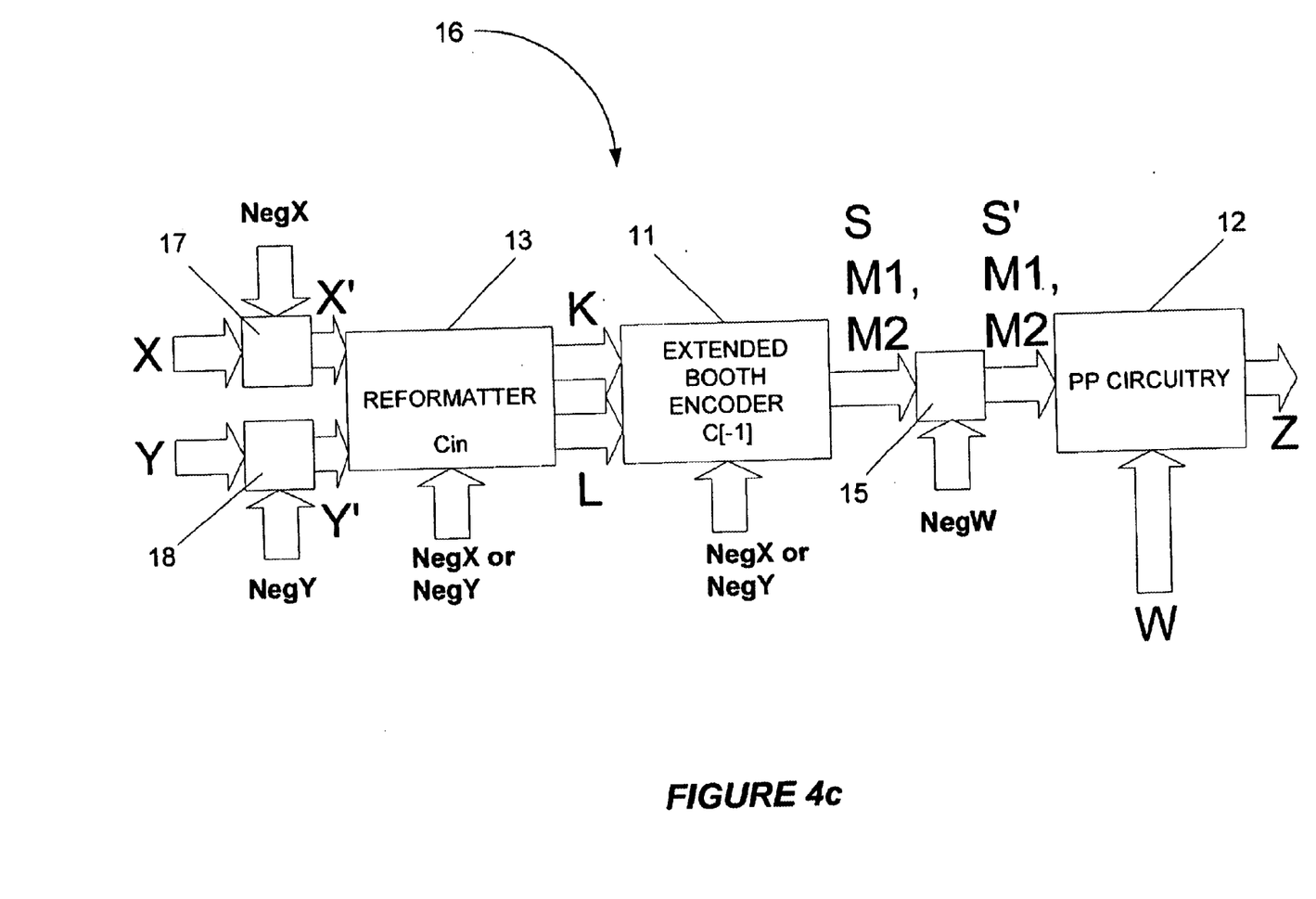
FIG. 4c is a block diagram of a system for performing an arithmetic computation of the form Z=(±X±Y)*±W.

The function Z=W*(X+Y) can be extended to the more general function Z=±W*(±X±Y) where the exact function performed is controlled by three control signals, NegW, NegX, and NegY. A system 16 for performing this general computation is illustrated in FIG. 4c. As illustrated, the system 16 comprises logic circuitry 17, logic circuitry 18, reformatter 13, extended Booth encoder 11, logic circuitry 15, and partial products circuitry 12.

In this system, X is subtracted if NegX is 1 or added if NegX is 0. Y is subtracted if NegY is 1 or added if NegY is 0. The combination of X and Y is multiplied by –W if NegW is 1 or by W if NegW is 0. X and Y can be negated using the well known relationship –X=~X+1 for two's complement numbers, where the ~ operator inverts all the bits of X. One way to implement this relationship is to form, in logic circuitry 17, X', where X'=NegX^(X)+NegX, where NegX^(X) indicates that each bit of X is to be exclusive-or'ed with NegX. Likewise, in logic circuitry 18, Y' is defined, where Y'=NegY^(Y)+NegY. Since both the extended Booth encoder 11 and the reformatter 13 have carry inputs, C[–1] and Cin respectively, the (±X±Y) function can be implemented by applying X' to the X input and Y' to the Y input of the reformatter 13 and NegX and NegY respectively to the two carry inputs, C[–1] and Cin.

NegW operates on the output of extended Booth encoder 11: the product W*(±X±Y) can be inverted by inverting, in logic circuitry 15, the sign bit, S[n], in all the Booth triplets output by the extended Booth encoder, S'=NegW^(S), and applying S' instead of S to the partial-product circuitry 12.

Figure 5:
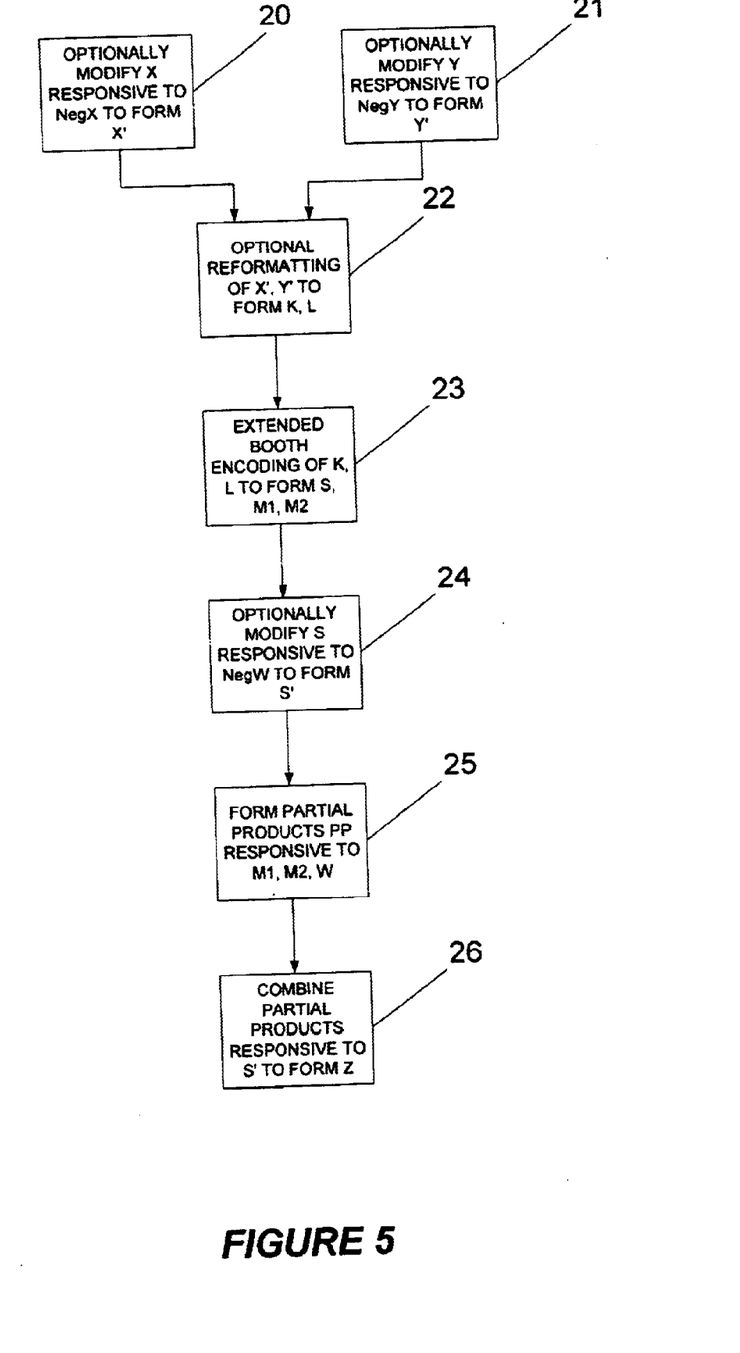
FIG. 5 is a flowchart depicting one embodiment of a method in accordance with the subject invention.

A general method for applying an extended Booth encoder to perform arithmetic computations of the form Z=±W*(±X±Y) is illustrated in FIG. 5. As illustrated, in optional step 20, the operand X is modified responsive to NegX in the manner previously described to form X'. Similarly, in optional step 21, the operand Y is modified responsive to NegY in the manner previously described to form Y'. (These two steps can be performed in parallel or serially).

In optional step 22, X' and Y' (or X and Y as the case may be) are reformatted in the manner previously described to form K and L, and in step 23, extended Booth encoding of K and L is performed to form S, M1, and M2.

In optional step 24, the output S is modified responsive to NegW to form S'.

In step 25, the partial products PP are formed responsive to M1, M2, and W in the manner previously described.

In step 26, the partial products are combined responsive to S' (or S as the case may be) in the manner previously described to form Z.

These method steps may be embodied in tangible form as software executable by a processor and stored on a computer readable medium which is accessible by the processor.

In general, the extended Booth encoder can be used with a carry-save adder to multiply the sum of any number of binary-weighted numbers by another number, Z=W*(X0+ X1+ . . . +Xn). To do this, one applies the sum and carry outputs, S and C, respectively, of a carry-save adder that sums X0 through Xn, to the K and L inputs, respectively, of the extended Booth encoder. S and C can be applied to K and L in at least two ways. First, S and C can be applied to K and L through a reformatter as described above. Second, the carry-save adder can be modified to propagate C[2n], which forces C[2n]=0, and save C[2n+1] for all n. When this is done, the carry-save adder becomes a partial-carry-save adder as only some of the carry bits are saved.

A special case of the ability to perform the operation Z=W*(X0+X1+ . . . +Xn) arises when X0 through Xn are all of the partial products resulting from the multiplication U*V. In that case, the operation performed is Z=U*V*W.

These examples demonstrate the versatility of the extended Booth encoder, particularly when used with carry-save, partial-carry-save, or short ripple-carry adders. One skilled in logic or hardware DSP design will see many other useful applications for this device. Further, though the descriptions here imply the use of hardware logic devices, it is clear that these functions could also be implemented in a processor programmed to perform them.

While embodiments, implementations, and examples have been shown and described, it should be apparent that there are many more embodiments, implementations, and examples that are within the scope of the subject invention. Accordingly, the invention is not to be restricted except in light of the appended claims and their equivalents.

What is claimed is:

1. An extended Booth encoder for receiving K and L, wherein L[2n]=0, N−1≧n≧0, with N being the length of L, and, responsive thereto, forming S, M1, and M2 which satisfy the following equations:

$C[n]=K[2n+1]|L[2n+1]$ $S[n]=K[2n+1]\hat{\ }L[2n+1]$ $M1[n]=K[2n]\hat{\ }C[n-1]$ $M2[n]=(S[n]\&/K[2n]\&/C[n-1])|(/S[n]\&K[2n]\&C[n-1])$ where | refers to the logical OR function, ^ to the exclusive OR function, & to the logical AND function, and/to the logical inversion function.

2. The Booth encoder of claim 1 embodied as hardware.

3. The Booth encoder of claim 1 embodied as software stored on a computer readable medium.

4. A system for receiving K, L, and W, wherein L[2n]=0, N−1≧n≧0, with N being the length of L, and, responsive thereto, performing an arithmetic computation of the form Z=(K+L)*W, comprising:

the extended Booth encoder of claim 1 for receiving K and L, and outputting S, M1, and M2; and partial products circuitry configured to (1) form one or more partial products PP responsive to M1 and M2 as follows: PP[n] is set to W*(4**n) when M1[n]=1, and PP[n] is set to 2*W*(4**n) when M2[n]=1; and (2) combine the one or more partial products to form Z responsive to S as follows: subtract PP[n] from Z when S[n]=1, and add PP[n] to Z when S[n]=0.

5. A system for receiving X, Y, and W, and, responsive thereto, performing an arithmetic computation of the form Z=(X+Y)*W, comprising:

a reformatter for reformatting X and Y to form K and L such that L[2n]=0, N−1≧n≧0, and X[N−1:0]+Y[N− 1:0]=K[N:0]+L[N−1:0], where N is the length of L; and the system of claim 4 for receiving K, L, and W, and, responsive thereto, forming Z.

6. A system for receiving X, Y, W, NegX, NegY, and NegW, and, responsive thereto, performing an arithmetic computation of the form Z=(±X±Y)*±W, comprising:

first logic circuitry for XORing X and NegX and adding NegX to form X';

second logic circuitry for XORing Y and NegY and adding NegY to form Y';

a reformatter for reformatting X' and Y' to form K and L such that $L[2n]=0$, $N-1 \geq n \geq 0$, and $X'[N-1:0]+Y'[N-1:0]=K[N:0]+L[N-1:0]$, where N is the length of L, the reformatter having a carry in input, Cin, coupled to a first selected one of NegX and NegY;

an extended Booth encoder for receiving K, L, and W, wherein $L[2n]=0$, and, responsive thereto, forming S, M1, and M2 which satisfy the following equations:

$C[n]=K[2n+1]|L[2n+1]$ $S[n]=K[2n+1]\char`\^L[2n+1]$ $M1[n]=K[2n]\char`\^C[n-1]$ $M2[n]=(S[n]\&/K[2n]\&/C[n-1])|(/S[n]\&K[2n]\&C[n-1])$ wherein C[−1] is set to a second selected one of NegX and NegY other than the first selected one, and wherein | refers to the logical OR function, ^ to the exclusive OR function, & to the logical AND function, and/to the logical inversion function;

third logic circuitry for XORing S and NegW to form S'; and partial products circuitry configured to (1) form one or more partial products PP responsive to M1 and M2 as follows: PP[n] is set to W*(4**n) when M1[n]=1, and PP[n] is set to 2*W*(4**n) when M2[n]=1; and (2) combine the one or more partial products to form Z responsive to S' as follows: subtract PP[n] from Z when S'[n]=1, and add PP[n] to Z when S'[n]=0.

7. A method for performing extended Booth encoding of K and L to form S, M1, and M2, comprising the steps of:

receiving K and L, wherein $L[2n]=0$, $N-1 \geq n \geq 0$, with N being the length of L; and forming S, M1 and M2 which satisfy the following equations:

$C[n]=K[2n+1]|L[2n+1]$ $S[n]=K[2n+1]\char`\^L[2n+1]$ $M1[n]=K[2n]\char`\^C[n-1]$ $M2[n]=(S[n]\&/K[2n]\&/C[n-1])|(/S[n]\&K[2n]\&C[n-1])$ where | refers to the logical OR function, ^ to the exclusive OR function, & to the logical AND function, and/to the logical inversion function.

8. A method for performing an arithmetic computation of the form Z=(K+L)*W comprising the following steps:

receiving K, L, and W, wherein $L[2n]=0$, $N-1 \geq n \geq 0$, with N being the length of L;

extended Booth encoding of K and L to form S, M1, and M2 using the method of claim 7;

forming one or more partial products responsive to M1, M2, and W by setting the partial product PP[n] to W*(4**n) if M1[n]=1 and setting the partial product PP[n] to 2*W*(4**n) if M2[n]=1; and combining the one or more partial products to form Z by subtracting the partial product PP[n] from Z if S[n]=1 and adding the partial product PP[n] to Z if S[n]=0.

9. A method for performing an arithmetic computation of the form Z=(X+Y)*W comprising the steps of:

reformatting X and Y to form K an L, wherein $L[2n]=0$, $N-1 \geq n \geq 0$, and $X[N-1:0]+Y[N-1:0]=K[N:0]+L[N-1:0]$, N being the length of L; and performing the method of claim 8 on K, L, and W to form Z.

10. A method for performing an arithmetic computation of the form Z=(±X±Y)*±W comprising the following steps:

forming X'=(X^NegX)+NegX, wherein ^ refers to the logical XOR function, and + refers to the logical AND function;

forming Y'=(Y^NegY)+NegY;;

reformatting X' and Y' to form K and L, wherein $L[2n]=0$, $N-1 \geq n \geq 0$, and $X'[N1:0]+Y'[N-1:0]=K[N:0]+L[N-1:0]$, N being the length of L;

extended Booth encoding of K and L to form S, M1 and M2 which satisfy the following equations:

$C[n]=K[2n+1]|L[2n+1]$ $S[n]=K[2n+1]\char`\^L[2n+1]$ $M1[n]=K[2n]\char`\^C[n-1]$ $M2[n]=(S[n]\&/K[2n]\&/C[n-1])|(/S[n]\&K[2n]\&C[n-1])$ wherein | refers to the logical OR function, ^ to the exclusive OR function, & to the logical AND function, and/to the inversion function;

XORing S with NegW to form S';

forming one or more partial products PP responsive to M1 and M2 as follows: PP[n] is set to W*(4**n) when M1[n]=1, and PP[n] is set to 2*W*(4**n) when M2[n]=1; and combining the one or more partial products to form Z responsive to S' as follows: subtract PP[n] from Z when S'[n]=1, and add PP[n] to Z when S'[n]=0.

11. A computer readable medium tangibly embodying any one of the methods of claim 7, 8, 9, or 10.

12. An extended Booth encoder comprising means for receiving K and L, wherein $L[2n]=0$, $N-1 \geq n \geq 0$, with N being the length of L, and, responsive thereto, forming S, M1, and M2 which satisfy the following equations:

$C[n]=K[2n+1]|L[2n+1]$ $S[n]=K[2n+1]\char`\^L[2n+1]$ $M1[n]=K[2n]\char`\^C[n-1]$ $M2[n]=(S[n]\&/K[2n]\&/C[n-1])|(/S[n]\&K[2n]\&C[n-1])$ where | refers to the logical OR function, ^ to the exclusive OR function, & to the logical AND function, and/to the logical inversion function.

13. The encoder of claim 12 implemented in hardware, software, or a combination of hardware and software.

14. The encoder of claim 12 in combination with a reformatter for reformatting two numbers X and Y to form K and L.

15. The combination of claim 14 in further combination with partial products circuitry for forming partial products responsive to M1 and M2, and combining the partial products responsive to S.

16. A logic circuit including the encoder of claim 12.

17. A method for performing extended Booth encoding of K and L to form S, M1, and M2, comprising:

a step for receiving K and L, wherein $L[2n]=0$, $N-1 \geq n \geq 0$, with N being the length of L; and a step for forming S, M1 and M2 which satisfy the following equations:

$$C[n]=K[2n+1]|L[2n+1]$$

$$S[n]=K[2n+1]\hat{}L[2n+1]$$

$$M1[n]=K[2n]\hat{}C[n-1]$$

$$M2[n]=(S[n]\&/K[2n]\&/C[n|1])|(/S[n]\&K[2n]\&C[n-1])$$

where | refers to the logical OR function, ^ to the exclusive OR function, & to the logical AND function, and /to the logical inversion function.

18. A computer program product tangibly embodying the method of claim 17.

19. A processor readable medium holding a sequence of software instructions embodying the method of claim 17.

20. A system comprising the processor readable medium of claim 19 in combination with a processor configured to access and execute the software instructions held in the processor readable medium.

* * * * *